Jan. 23, 1940.  G. FROVA  2,188,181
FRUIT PITTING MACHINE
Filed April 27, 1938  2 Sheets-Sheet 1
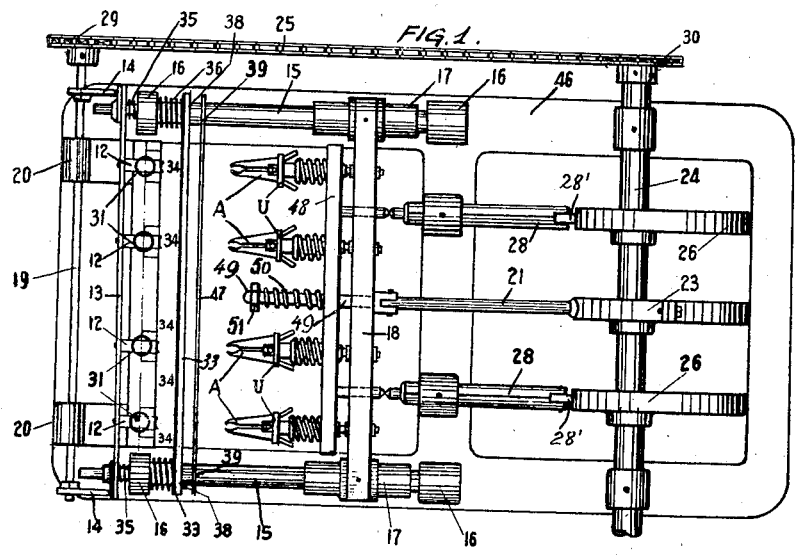
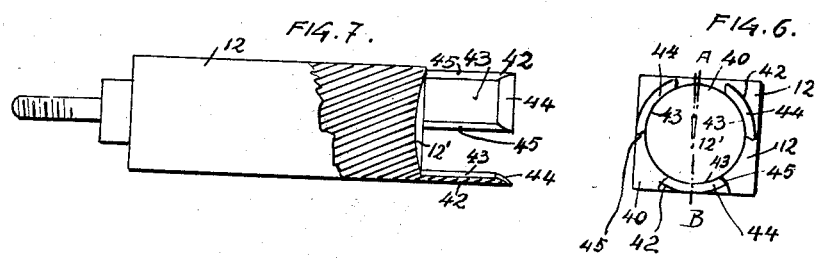
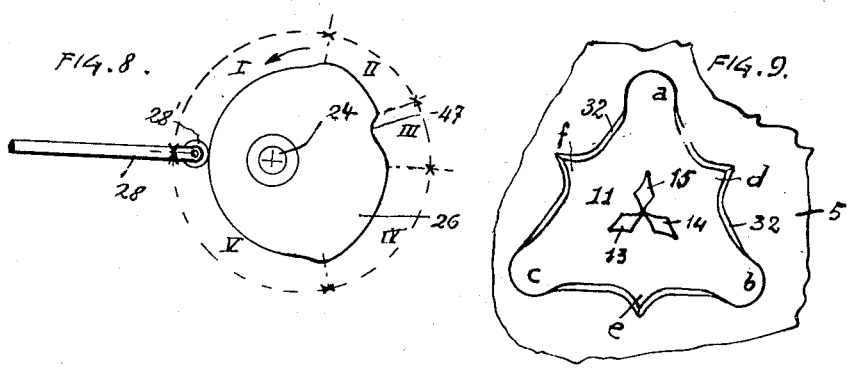
INVENTOR:
GIOVANNI FROVA
BY Haseltine, Lake & Co.
ATTORNEYS

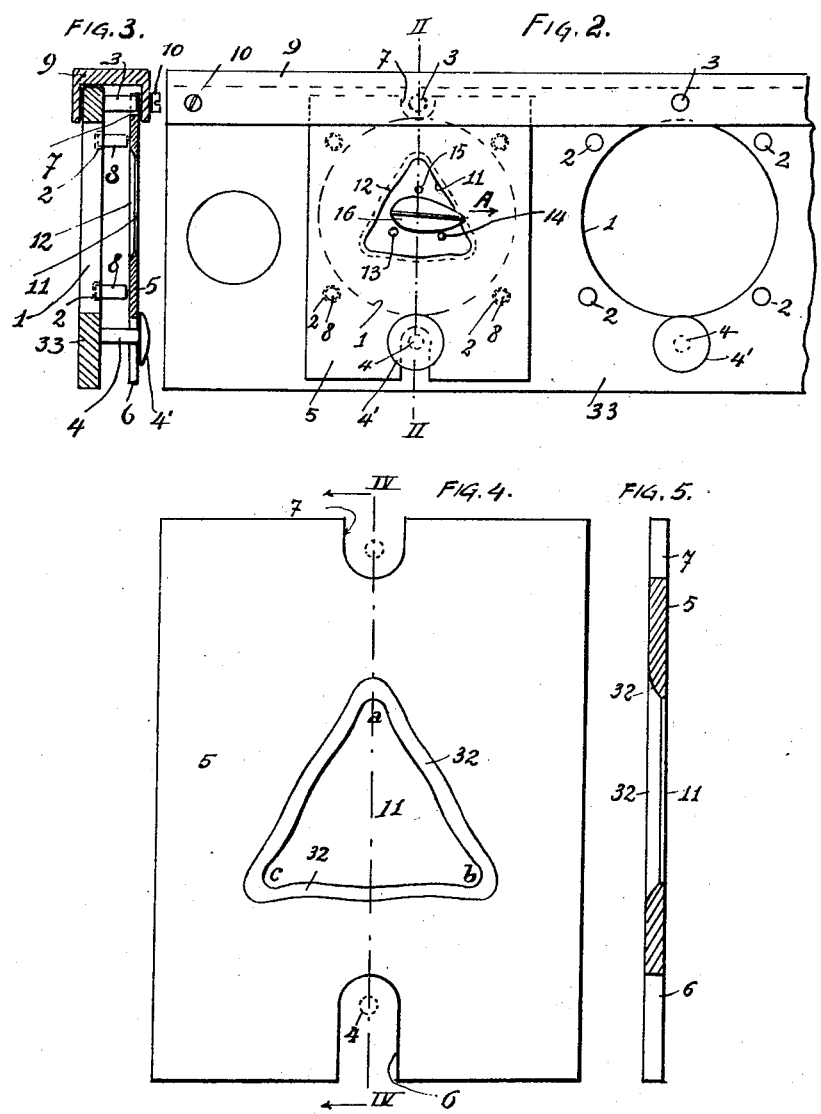

Patented Jan. 23, 1940

2,188,181

UNITED STATES PATENT OFFICE 2,188,181

FRUIT PITTING MACHINE

Giovanni Frova, Milan, Italy

Application April 27, 1938, Serial No. 204,500
In Italy June 3, 1937

4 Claims. (Cl. 146—17)

The present invention refers to improvements in fruit-pitting machines of the same pattern specified and illustrated in the prior U. S. Patent No. 1,977,675 namely to machine comprising: a hopper, into which fruits are placed in bulk; in said hopper, a movable bottom, having an alternating motion and having a number of holes in each of which can enter just one fruit at a time; conduits or tubes into which said fruits fall on leaving said holes; tools in the shape of pincers for pitting said fruits; a carriage carrying such part of said tools on which are mounted the swinging arms of the pincers; a driving shaft; a cross-bar, parallel to said carriage, on which are fitted the members of said tools which control the opening and closing motions of the pincer's arms; eccentrics mounted on said driving shaft and connected to said carriage, imparting to it alternating motions; cams keyed to said driving shaft, for transmitting, through slidable bars, alternating motions to said cross-bar; a cross-plate provided with means for allowing the passage of the pincer's arms of said tools and for stopping the fruits during the pitting operation; a second cross-plate provided with means for allowing the passage through them of said seizing arms and for taking out of the latter the stones pitted out of the fruits; plungers movable alternatively, for expelling the fruits from the open lower end of said conduits, to carry them in the proper position in which the seizing pincers of the tools extract the stones from the fruits and means for controlling the alternating motion of said plungers.

In particular, the invention refers to improvements in the cross-plate for stopping the fruit during the pitting phase; to the plungers expelling the fruits from said conduits and to the means for controlling the alternating motions of said cross-bar and for timing properly the motions for opening and closing the seizing pincers of said tools.

The improvement achieved in the cross-plate, for stopping the fruit during the pitting phase, consists in this, that ample apertures are cut out in said cross-plate, of any convenient shape, the centre point of each aperture being placed on the extension of the centre-line of the corresponding tool for seizing and pitting said fruit, whilst the holes, substantially triangular, allowing a passage for the seizing pincers of said tools, are cut each in a plate elastically mounted on the bar at a slight distance from the same, in order to allow slight swinging movements and approach to the bars, on their being pressed during the pitting phase of the operation.

The substantially triangular hole in each small plate, will appear more or less inscribed in the corresponding hole cut-out in the main plate. The object of this improvement is to render easier the extraction of the stone, the swinging of the small plate allowing for a reduction in the stress of the seizing pincers of the tools and therefore a reduction in eventual breakages of the same.

The improvements in the plunger slides for expelling the fruits from the conduits, consist in this, that each plunger ends with three or more appendices, placed at a certain distance one from another and having their inside surface curved cylindrically. The centre-line of said surface is coincident with the extended centre-line of the corresponding seizing and pitting tool.

The fruits are pushed between said appendices during the concomitant feeding motion of the plungers, one towards the other, and of the tools, so that the fruits get perfectly centered with respect to the pitting tools.

The improvement concerning the control of the seizing and the pitting tools, obtaining, immediately before the phase of the seizing of the stones, a number of clean radial cuts in the fruits, consists in this, that a recess is provided on the profile of each cam as shown with reference to number 26 in said United States patent which acts on the rollers of the push-rod controlling the opening and closing of the pincers or seizing arms of said tools.

After that said tools, on advancing with the points closed or half closed, have cut-in the fruit and have pushed it between said appendices, straight towards the bottom of the fruit expelling plates from the distributing conduits, the rollers jump into said cams recesses causing a quick opening of said pincers, and these, with the cutting outer edges of their extreme ends, obtain clean radial cuts in the fruits; which cuts subsequently extend during the succeeding phase of the extraction of the stones.

This improvement comprises also resilient means operating on said rollers, for securing their constant contact with the cam's profile and for causing them to drop in the cam's profile recesses.

The attached drawings show, by way of example, an embodiment of the improvements forming the object of the present invention. In said drawings:

Fig. 1 is a plan view of the machine, to which are applied the improvements stated above and is substantially a reproduction of Fig. 2 of the drawings attached to the said prior United States patent.

Fig. 2 is a view in elevation and in larger scale, of part of plate 33 of the machine shown in Fig. 1, the left-hand part showing a swinging small plate, fitted in position, whilst the right-hand part is shown without said plate.

Fig. 3 is a section on line II—II of Fig. 2.

Fig. 4 shows in elevation and in still larger scale, a swinging small plate, seen from the side facing plate 33.

Fig. 5 is a section of Fig. 3 along line IV—IV.

Fig. 6 is a view of the free-end of plunger 12, as improved.

Fig. 7 is a section along line A—B of Fig. 6.

Fig. 8 shows the shape, substantially given to each cam controlling the opening and closing of the tools for seizing and extracting the stones and shows also the recesses on the cam's profile provided for obtaining the small radial cuts in the fruits.

Fig. 9 shows an alternative of Fig. 4.

With reference to Figs. 1 to 5, showing the first improvement, ample apertures 1 are cut out from plate 33, whose centres are in line with the extended centre-line of the seizing and pitting tools. Apertures 1 may have any required shape, different from the circular one shown. On the sides of said apertures, are cut-out, in the face of the plate opposite to the tubes 31 (Fig. 1), a number of recesses 2 (Fig. 2, at the left, and 3) for receiving one of the ends of the short resilient members 8 (for instance, small rubber cylinders, spiral springs or the like). From one end near to the upper edge of cross-plate 33 and right over each aperture 1, extends a cylindrical pin 3, whilst another pin 4 extends, from a point diametrically opposed, near to the lower edge of the cross-plate: this second pin ends with a head 4'.

The pins 3 and 4 can be placed in positions different from that specified and illustrated, provided they be always diametrically opposed relatively to aperture 1. The recesses 2 can also be arranged differently from what is shown in the attached drawings. The pins 3 and 4 project from the side of the plate facing the tubes 31.

5 is a small plate placed in front of each aperture 1 of plate 33: it is provided with notches 6 and 7, diametrically opposed, and having the shape of an U with semicircular bottom and a width conveniently greater than the diameters of pins 3 and 4 entering said notches 7 and 6, respectively, whereby some play is managed between the pins and the notches.

For fitting each small plate 5, on pressing down the elastic members 8, pin 4 is first engaged in notch 6; the head 4' of said pin acting as a stop. Then pin 3 is engaged in notch 7, by pressing down the small plate on the elastic members 8. In order to retain said small plate in position and at the same time to allow its alternating or swinging motions, a channel iron bar 9 is used, having an upturned U section, and is placed astride of the upper edges of cross-plate 33 and of the various small plates 5 to which it is secured by the screw 10; each small plate 5 being provided with a hole 11, symmetrically placed with regard to the respective aperture 1 of the cross-plate 33, and in the proper position for allowing the seizing arms of the pitting tools (shown in A—U in Fig. 1) to pass freely through it.

The contour of hole 11 is substantially an equilateral triangle with rounded vertices a, b, c, and slightly curved sides, substantially as shown in Figs. 2 and 4. Its edges are chamfered for a part of the depth, namely on the face opposite to that against which the fruit comes to bear, when the tools A—U, after having caught the stone, recede for its extraction.

According to an alternative shown in Fig. 9, in the centre-line of each side of the holes of the small plate 5, can be cut-out notches, d, e, f, substantially angular, as stated above; such an alternative has the object of securing an easier extraction of the stones and of annulling any stress on the tools. In said Fig. 9 are shown, diagrammatically in 13, 14 and 15 the seizing pincers of the tools in their closed position.

The position of hole 11 can be different from that shown in the figures, provided the angles a, b and c, lie in the radial planes in which the seizing arms of tools A—U move.

The device operates in the following manner: Supposing a stone 16 (Fig. 2), due to its abnormal position in the fruit, or due to any other cause, be seized by the pincers of tool A—U (shown diagrammatically by point 13, 14 and 15) so as to strike with its end the right-hand edge of hole 11, then, due to the elastically swinging fixture of the small plate 5, the same will be compelled to move in the direction of arrow A, for allowing the stone to pass on, what is allowed by the play existing between the edges of notches 6 and 7 and the respective pins 3 and 4. Due to this, the seizing pincers of the tool A—U, will not be stressed too much, thus preventing breakages and the stopping of the machine.

The sharp edge of hole 11, besides offering an obstacle to the fruit's advance, is also a point of bearing allowing the spreading of the fruit's pulp, thus rendering easier the stone's extraction.

The elastic fixture of the small plate 5, specified and illustrated, is shown simply as an example, limiting in no way the invention, and can be replaced by any other means allowing both a slight swinging motion in the plane of the plates and a small alternating motion of the same.

Referring now to the improvement illustrated by Figs. 6 and 7, the plunger 12 carries at its free end, three longitudinal appendices 42, at 120° one from another and having their inside-surface curved cylindrically, their upper edges 44 being chamfered towards the inside and their longitudinal edges 45 chamfered or rounded up from the inside towards the outside.

Preferably, but not necessarily, the head 12' of the plunger (from which the appendices 42 extend) is slightly bent inwards.

Referring to the improvement shown in Figs. 1 and 8, for obtaining a quick opening of the seizing pincers of tool A—U, for cutting into the fruit clean radial cuts, said improvement provides, in a convenient point of cams profile 26 controlling the opening and closing of the arms of said tools, a recess 47, into which snaps the roller 28' (Fig. 1) of the rod 28. The snap of said roller 28' takes place due to the action of a spring device, which will be hereinafter described, and which operates a quick approach of the cross-bar 48 to the cross-bar 18, thus causing a quick backward movement of the muffs U solid with the bar 18 and controlling the radial displacements of the pincers pivotally mounted at the free end of rods solid with cross-bar 48, and on which said muff are threaded. As a result of the quick approach of the bar 18 to cross-bar 48 and consequent quick backward movement of said muffs, a snap of the fore arms of the pincers takes place in the open position.

The said spring device, cooperating with said push-rod 28 and cams 26 as well as with tie-rod 21 and eccentric 23, operatively connected with the cross-bar 48 and bar 18, respectively, and controlling the relative displacements of said cross-bar 48 and bar 18 in order to alternately and at the proper moments open and close the pincers, is as follows.

On the forward face of cross-bar 18 (to which are fixed the rods on which are pivoted the seizing pincers of tool A—U) are secured one or more rods 49 (in the drawings) a single one is shown for clearness' sake) parallel to the longitudinal centre-line of the machine. Said rods 49 pass through holes cut into the other cross-bar 48 (into which are secured the members controlling the opening and the closing of said seizing pincers). On the part of each of the rods 49, extending outside cross-bar 48, is slipped a strong spiral-spring 50, whose pressure is adjusted with a nut 51 screwed on the end of the same rod 49 A counter-nut can fix-up the position of said nut.

According to an alternative, rod 49 can be fixed to the backward face of cross-bar 48, and will then pass through holes cut into cross-bar 18. In this case the spiral-spring will work between the back face of cross-bar 10 and nut 51, screwed on the backward extending end of bar 49.

Both the above means can be used jointly.

The operation of the two improvements illustrated by Figs. 1, 6, 7 and 8 is the following: When the plungers 12 advance through the lower-end of the fruit distributing tubes, each of them pushes one fruit out of the corresponding distributing tube, towards the tool A—U, which moves against it with closed pincers, going through holes 47 of the small plates 5 and of main plate 33. The closed or half-closed points of said tools, on striking a fruit, first cut into its pulp until they strike the stone. Immediately afterwards, due to the plunger's and the tool's simultaneous advance one against the other, the fruits are driven through the appendices 42 of plunger 12 until they come to bear on the head 12' of the same, allowing the fruit's pulp to expand in the free spaces 46 between said appendices 42. As soon as the fruits have reached this position, the seizing pincers of tools A—U open suddenly, and the latter with their outer cutting edge, cause clear radial cuts in the pulp, what is followed by a further simultaneous slight advance, one against the other, of the plunger and the tool A—U, and by a relatively quick closing of the seizing pincers of the tool for seizing the stones. Such a snap or quick opening of the seizing pincers of tools A—U is obtained because the roller 28', of push-rod 28 (Figs. 1 and 8) is, retrieved and snaps into recess 47 of cam 26, such snap being controlled by the spring device 49, 50, 51 specified above.

Supposing now that the cams 26, shown in Figs. 1 and 8, should be in the final recessive phase of the cross-bar carriage 18 (or at the beginning of the advancing phase) and that the seizing pincers of tools A—U should be open and that said cams 26 be revolved in the direction of the arrow shown in Fig. 8. On putting the machine in motion, said cams 26, acting on the push rod 28, will cause:

(1) In the advancing phase—

(a) For the arc I of the cam's profile, a beginning of approach towards the closing position of the seizing pincers of tools A—U, still allowing however their passage through the holes of the cross-plates 47 (Fig. 1), followed, towards the end, by the complete closure of said pincers;

(b) During the arc II, said pincers are kept closed up;

(c) For the arc III, a first quick snapping-opening of said pincers followed by their gradual and relatively quick closure.

(2) In the return phase—

(d) For the arc IV, the pincers are maintained in a closed position;

(e) For the arc V, a gradual opening, with relative rapidity, of said pincers to allow the members of plate 47 to cause the opening of said pitting pincers and the release of the extracted stones.

After what the cycle of operations is repeated.

It is to be understood that the shape of the cam may vary from the one illustrated in the drawings, according to the positions fixed for the plates 33 and 47 and according to the stroke of the carriage. The shape specified is to be considered as an example of an embodiment, in no way limiting the invention. Also the details in shape and design of the appendices of the plungers 12 and of the holes of the small plates 5, mounted on the plate 33 may vary in practice.

Having now particularly described and ascertained the nature of my said invention and in what manner the same is to be performed, I declare that what I claim is:

1. In a fruit-pitting machine having a frame and a rotatable shaft mounted thereon with at least one cam fixed on said shaft, a reciprocating member upon said frame carrying radially expansible pit extracting pincers, and a cross plate mounted on said frame having an aperture formed therein defining the area in or adjacent to which a fruit is to be pitted, the combination of a slidable plunger having fruit centering means projecting longitudinally therefrom capable of projecting the fruit against said pincers and centering the same with respect to the pincers, resiliently mounted means capable of oscillating with respect to the plane of said cross plate and serving to stop said fruit during the pitting operation so as to facilitate extraction of the pit, pincer operating means cooperating with said cam and opposed by spring means for controlling both the gradual opening and sudden closing and the timing of the operation of said expansible pincers and means upon said cam including a profile portion causing once every revolution thereof the sudden operation of said pincer operating means so as to cause a converging snapping radial movement of said extracting pincers in order to cut clean radial cuts into said fruit.

2. A fruit-pitting machine according to claim 1, wherein the aperture in the cross plate is ample in its dimensions to allow for movements of the pit extracting pincers, and a second smaller plate is applied to said cross plate in front of said aperture on the face of the same facing the general direction from which the fruit arrives, a substantially triangular aperture being formed in said smaller plate having a substantially triangular chamfer on the edges of the side of said plate facing the cross plate and being substantially symmetrical with and corresponding to the aperture in the latter, pin means projecting from opposite points upon said cross plate with respect to the aperture therein toward the smaller plate, one of said pin means having an enlarged head, corresponding notches being cut into opposite portions of the smaller plate with respect to the triangular aperture therein and being capable of being engaged by said pin means with slight play, resilient means disposed between the cross plate and smaller plate to keep the latter spaced from the cross plate while allowing limited swing movements thereover, a channel member of about the same length as said cross plate having an upturned U-section and disposed astride with its side walls on the edge of the cross plate and on the edge of said smaller plate so as to keep the latter in place and allow for said limited swinging movements, and means for securing said channel member to the cross plate.

3. A fruit-pitting machine according to claim 1, wherein the longitudinally projecting fruit centering means of the plunger are disposed upon the one end thereof directed toward the pit extracting pincers and mutually spaced apart to allow ample clearance space between each adjacent pair of centering means for introduction and operation of each individual pit gripping portion, and wherein said plunger fruit centering means are interiorly cylindrically curved with the forward edges chamfered upon the inside and the lateral edges chamfered upon the outside.

4. A fruit-pitting machine according to claim 1, wherein a carriage has a rigid member with the pit-extracting pincers pivotally mounted on the end thereof, an eccentric upon the main shaft for reciprocating said carriage, and the pincer operating means for opening and closing the pincers include a cross bar parallel with said carriage having a muff controlling operation of said pincers and a bar member extending past said carriage operated by the cam and acting upon said cross bar so as to be capable of moving the cross bar, a resilient device cooperating with said bar member in order to cause said cross bar to approach said carriage in order to cause opening of the pincers, and wherein the profile portion of the cam causing the snapping operation of the pincers includes a recess portion in the profile of said cam.

GIOVANNI FROVA.